(12) United States Patent
Byszio

(10) Patent No.: US 8,296,854 B2
(45) Date of Patent: Oct. 23, 2012

(54) CHIP CARD HAVING A FIRST USER FUNCTION, METHOD FOR SELECTING AN IDENTIFIER, AND COMPUTER SYSTEM

(75) Inventor: Frank Byszio, Wandlitz (DE)

(73) Assignee: Bundesdruckerei GmbH, Berlin (DE)

( * ) Notice: Subject to any disclaimer, the term of this patent is extended or adjusted under 35 U.S.C. 154(b) by 516 days.

(21) Appl. No.: 12/525,792

(22) PCT Filed: Feb. 18, 2008

(86) PCT No.: PCT/EP2008/051919
§ 371 (c)(1),
(2), (4) Date: Sep. 21, 2009

(87) PCT Pub. No.: WO2008/101889
PCT Pub. Date: Aug. 28, 2008

(65) Prior Publication Data
US 2010/0011449 A1    Jan. 14, 2010

(30) Foreign Application Priority Data
Feb. 20, 2007  (DE) .................. 10 2007 008 652

(51) Int. Cl.
*G06F 7/04* (2006.01)
*G06F 17/30* (2006.01)
*H04N 7/16* (2011.01)
(52) U.S. Cl. ........................... 726/28; 726/27
(58) Field of Classification Search .......... 902/26; 725/5; 716/138; 726/27–30, 35
See application file for complete search history.

(56) References Cited

U.S. PATENT DOCUMENTS

| | | | |
|---|---|---|---|
| 5,907,804 A | 5/1999 | Schroderus et al. | |
| 6,601,046 B1 * | 7/2003 | Epstein | 705/57 |
| 6,711,685 B1 | 3/2004 | Schaal et al. | |
| 7,240,216 B2 | 7/2007 | Ishikawa et al. | |
| 7,979,705 B2 * | 7/2011 | Schaeck et al. | 713/169 |
| 2002/0073332 A1 | 6/2002 | Ishikawa et al. | |
| 2004/0053642 A1 * | 3/2004 | Sandberg et al. | 455/558 |
| 2005/0164737 A1 * | 7/2005 | Brown | 455/558 |
| 2005/0266886 A1 * | 12/2005 | Chan | 455/558 |
| 2009/0159692 A1 | 6/2009 | De Groot et al. | |

FOREIGN PATENT DOCUMENTS

| | | |
|---|---|---|
| DE | 3523237 A1 | 1/1987 |
| DE | 19507043 A1 | 9/1996 |
| DE | 19507044 A1 | 9/1996 |
| DE | 19850307 A1 | 5/2000 |
| DE | 102005059066 A1 | 6/2007 |

(Continued)

OTHER PUBLICATIONS

Rankl W., et al., "Hanbuch der Chipkarten, Passage", Hanbuch der Chipkarten, Aufbaufunktionweise—Einsatz Von Smart Cards, pp. 450-459 Germany (Jan. 1, 1999); (translation pp. 491-500, 2003).

(Continued)

*Primary Examiner* — James A Reagan
*Assistant Examiner* — Calvin Cheung
(74) *Attorney, Agent, or Firm* — Matthew B. Dernier, Esq.; Gibson & Dernier LLP

(57) ABSTRACT

The invention relates to a chip card having a first user function, whereby the first user function may be reset to a "first use" status by entering a code (B, C).

12 Claims, 6 Drawing Sheets

FOREIGN PATENT DOCUMENTS

| | | | |
|---|---|---|---|
| EP | 0730253 | A2 | 9/1996 |
| EP | 0776141 | A | 5/1997 |
| EP | 0973134 | A | 1/2000 |
| EP | 1215633 | A | 6/2002 |
| FR | 2877790 | A | 5/2006 |

OTHER PUBLICATIONS

Rankl W., et al., "Hanbuch der Chipkarten: 7.5 Identifizierungskommandos; 7.6 Authentifisierungskommandos", Hanbuch der Chipkarten, Kommandos von Chipkarten, pp. 412-420 Germany (Jan. 1, 1999); (translation 453-467, 2003).

International Search Report for corresponding Application PCT/EP2008/051919, dated: Sep. 30, 2008.

International Preliminary Report on Patentability and Written Opinion for corresponding Application PCT/EP2008/051919, dated: Mar. 20, 2009.

* cited by examiner

CHIP CARD HAVING A FIRST USER FUNCTION, METHOD FOR SELECTING AN IDENTIFIER, AND COMPUTER SYSTEM

BACKGROUND

The invention relates to a chip card having a first user function, a method for selecting an identifier for enabling a chip card having a first user function, and a computer system.

For enabling a chip card function, prior user identification with respect to the chip card may be necessary, as known per se from the prior art. The most common user identification is the entry of a secret identifier, generally referred to as a personal identification number (PIN) or card holder verification (CHV). Such identifiers generally consist of a numeric or alphanumeric character string. For user identification, the identifier is entered by the user on the keyboard of a chip card terminal or a computer connected to a chip card reader, and is then sent to the chip card. The chip card compares the entered identifier to the stored identifier, and then communicates the results to the terminal or the computer by outputting a corresponding signal.

A distinction may be made between static and changeable PINs. A static PIN cannot be changed by the user and must be memorized. If the PIN has become known by outside parties, the card user must destroy the chip card to prevent misuse by unauthorized persons, and must obtain a new chip card having another static PIN. Likewise, the user must obtain a new chip card if he forgets the static PIN.

A changeable PIN may be changed by the user at will. To change the PIN, for security reasons it is always necessary to surrender the currently valid PIN, since otherwise another person could use any existing PIN in place of his own.

The situation is different for "super PINs" or personal unlocking keys (PUKs). These generally have more character spaces than the actual PIN, and are used to reset a PIN incorrect entry counter (also referred to as an incorrect operation counter) which is at its maximum value. Similarly, by use of the PUK a new PIN is transferred to the chip card, since a reset incorrect operation counter is of little use if the PIN has been forgotten. This is usually the case when the incorrect operation counter has reached its maximum value.

There are also applications which use transport PINs. The chip card is personalized with a random PIN which the card user receives in a PIN letter. At the first use, however, the user is prompted by the chip card to replace the personalized PIN with the user's own PIN. In a similar process referred to as the "zero PIN process," the chip card is preassigned a trivial PIN such as "0000," and the chip card likewise requires the PIN to be replaced upon first use (also see DE 35 23 237 A1, DE 195 07 043 A1, DE 195 07 044 C2, DE 198 50 307 C2, and EP 0 730 253 B1).

A method is known from DE 198 50 307 C2 for protecting chip cards from misuse. The chip card has a first user function which requires a personal secret number (PIN), freely selectable by the user, upon first use of the data and/or functions of the chip card, whereby entry of the personal secret number sets data and/or functions of the chip card to a "used" status. The personal secret number may subsequently be changed by use of a higher-level blocking code.

Compared to chip cards with a static PIN, chip cards with a changeable PIN have the advantage that the chip card does not necessarily have to replaced with a new one if the user has forgotten the PIN, for example by the fact that the incorrect operation counter is reset by use of the PUK and a new PIN is entered. However, such a procedure is unacceptable for security-critical applications, in particular for provision of digital signatures and in payment transactions, because of the limited protection from tampering. Therefore, re-entry of the PIN by means of the PUK is generally not permitted for applications which require high security. This means that only resetting of the incorrect operation counter is allowed using the PUK. Once again, the disadvantage in this case is that the chip card must be replaced if the PIN is forgotten.

SUMMARY OF THE INVENTION

Accordingly, the object of the invention is to provide an improved chip card, a method for selecting an identifier for enabling a chip card, and a computer system.

The object of the invention is achieved by the respective features of the methods and/or apparatus disclosed herein.

According to the invention, a chip card is provided with a first user function, which may be reset to a "first use" status by entering a code. In this context, "first user function" is understood to mean any function of the chip card which ensures that the chip card or a given chip card function has not previously been subject to unauthorized use before the authorized user of the chip card has selected a secret identifier such as a PIN, for example. This follows from the first user functions known from the prior art, in particular the first user functions known from DE 198 50 307 C2.

According to the invention, a first user function of the chip card is designed so that after prior use the first user function may be reset from its "used" status by the user. This resetting from the "used" status to the "first use" status is achieved in a secure manner, namely, by entering a code. The ability to reset the first user function to the "first use" status after prior use allows an identifier for enabling the chip card function to be reselected when, for example, the user has forgotten the identifier initially selected.

The invention is particularly advantageous since it allows a user to replace a forgotten identifier with a new one without having to destroy the chip card and obtain a new one, also for chip card applications in high-security areas. This may be carried out without security breaches due to the secure resetting of the first user function of the chip card by entry of a code known to the user.

According to one embodiment of the invention, the first user function of the chip card is designed so that it is able to accommodate a "used" status and the "first use" status. The status of the first user function is changed from "first use" status to "used" status when the user enters his selected secret identifier, for example a PIN, into the chip card, thus allowing the chip card to be further used for enabling a chip card function. By entering the code, at a later time the user can reset the first user function to "first use" status in order to replace the previously selected identifier with another one, for example when the user has forgotten the identifier initially selected.

According to one embodiment of the invention, the chip card has means for blocking the identifier previously selected by the user when a maximum number of incorrect entries for this identifier has been reached. It is preferred that entry of the code for resetting the first user function to "first use" status is possible only when the previously selected identifier is blocked, thus allowing the user to subsequently specify a new identifier.

According to one embodiment of the invention, the code for resetting the first user function is an activation code for an identifier, in particular a PIN, for enabling a chip card function. For example, the chip card has multiple so-called PIN objects, each PIN object being provided for specifying a PIN for enabling the same chip card function.

Before the user is able to enter an identifier which he has selected, he must first enter the corresponding activation code. The activation code may be used only once, and as a result the identifier for a given PIN object may be specified only once by the user. Afterwards it is no longer possible to change an identifier selected for a PIN object. However, since the chip card contains multiple PIN objects, a blocked PIN object for which the maximum number of incorrect entries has been reached may be replaced with an unused PIN object, for which the user may specify a new identifier. To specify the new identifier, the first user function is reset with regard to a previously unused PIN object by entering the activation code for the unused PIN object when the current object PIN object is blocked.

According to one embodiment of the invention, a use counter is associated with each of the activation codes. The use counters are not resettable, thereby ensuring that each of the activation codes may be used only once.

According to one embodiment of the invention, the chip card has an incorrect entry counter for each of the identifiers, whereby in the delivered state of the chip card the incorrect entry counters have a first initial value of 0, for example. The initial value indicates blockage of the affected identifiers. Thus, in the delivered state all PIN objects of the chip card are initially blocked. By entry of the activation code for the first PIN object of the chip card, the incorrect entry counter for this PIN object is set to a second value which corresponds to a maximum allowed number of incorrect entries, for example 3. The incorrect entry counter of a PIN object may be reset by use of a PUK, although the PIN cannot be changed using the PUK.

According to one embodiment of the invention, the chip card has means for establishing a communication channel to a computer, for example the server computer of a trust center, for reading an unused activation code from the chip card. For example, the activation codes associated with the PIN objects are stored in the chip card as part of the chip card operating system. An unused activation code may be read by the server computer via a secure communication connection, for example via a user PC having end-to-end encryption of the activation code.

The activation code is then transmitted from the server computer of the trust center via a secure connection, for example by means of secure messaging or HTTPS, to the user's PC. The user can then enter the activation code into the chip card in order to reset the first user function, thus allowing the user to specify an identifier again without having to replace the chip card.

In a further aspect, the invention relates to a method for selecting an identifier for enabling a chip card having a first user function, the first user function being reset to a "first use" status by entering a code in order to allow the user to enter the selected identifier.

In a further aspect the invention relates to a computer system, in particular a server computer of a trust center, having means for establishing a first communication channel to a chip card in order to read an activation code for a user-selectable identifier from the chip card, and means for establishing a second communication channel to a computer of a user of the chip card in order to transmit the activation code to the computer.

However, the computer system may also be designed in such a way that the activation codes for the chip cards outputted to the user are stored in a database or generated on demand. On the basis of a corresponding query by a user, an activation code not previously used is read or generated from the database in order to communicate the new activation code to the user, thus allowing a new identifier to be specified.

BRIEF DESCRIPTION OF THE DRAWINGS

Embodiments of the invention are explained in greater detail below with reference to the drawings, which show the following.

DETAILED DESCRIPTION OF THE INVENTION

Figure 1:
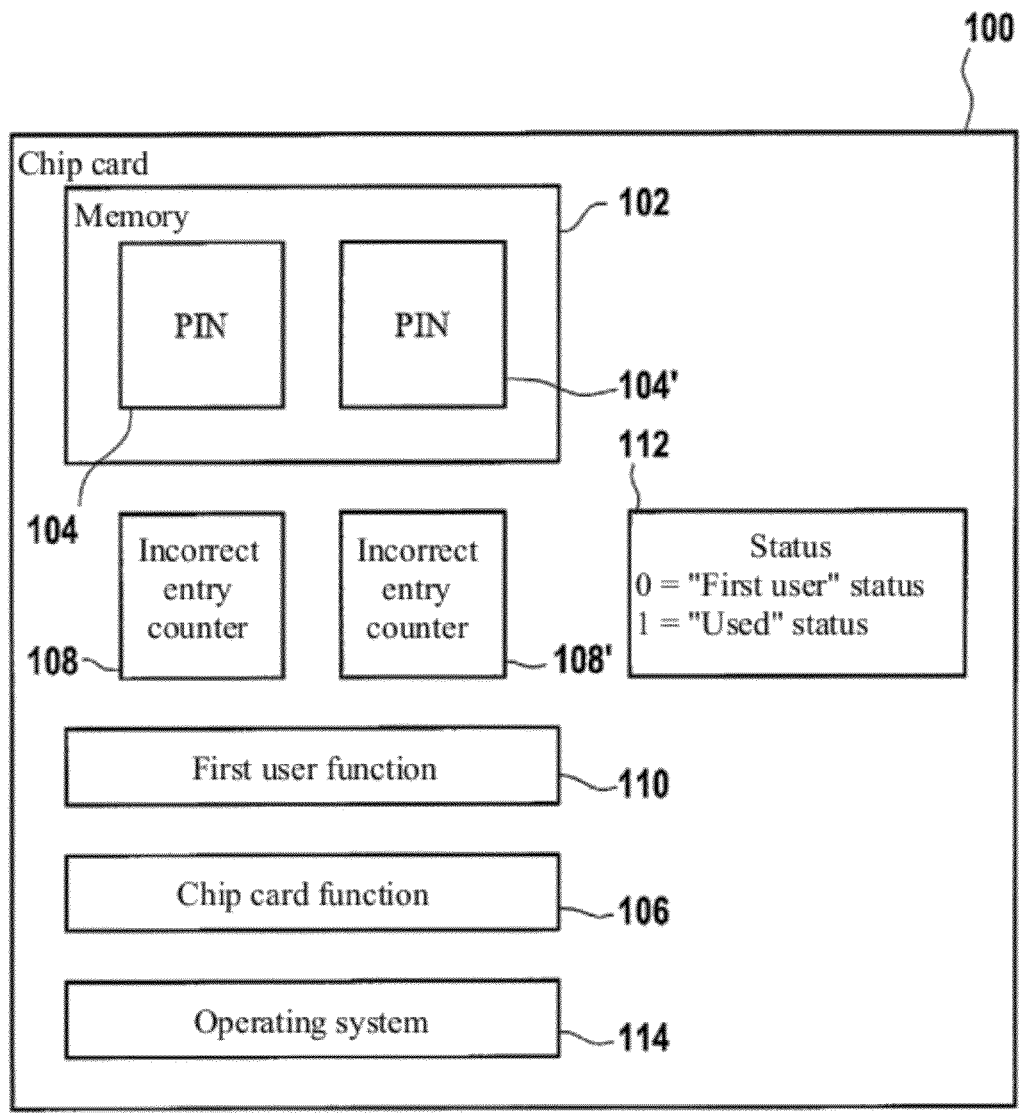
FIG. 1 shows a block diagram of a first embodiment of a chip card according to the invention.

Elements of the following figures which correspond to one another are denoted by the same reference numerals.

FIG. 1 shows a chip card 100 having an electronic memory 102 for storing a secret identifier 104 such as a PIN, for example. The secret identifier 104 is used to enable a chip card function 106 of the chip card 100.

The chip card 100 has an incorrect entry counter 108 for the secret identifier 104. The incorrect entry counter 108 is incremented or decremented after each invalid attempt to enter the identifier 104 until a maximum number of incorrect entries is reached. The number of incorrect entries may also optionally be increased by use of a PUK by resetting the incorrect operation counter multiple times by means of the PUK. However, it is not possible to change the PIN, i.e., identifier 104, using the PUK. The identifier 104 is blocked as soon as this maximum number of incorrect entries has been reached. When the identifier 104 is blocked, the chip card function 108 can no longer be enabled, even when a correct identifier is entered.

The chip card 100 has a first user function 110. The first user function 110 includes a status register 112 which indicates the current status of the first user function. In the present embodiment the first user function 110 may have two statuses: the "first use" status, i.e., status=0, which indicates that an identifier 104 has not yet been specified by the authorized user, or a "used" status, i.e., status=1, which indicates that a valid identifier 104 has been specified by the authorized user and has been stored in the memory 102. On the basis of the status of the first user function 110 stored in the status register 112, an authorized user can also ensure that an identifier has not already been specified by an unauthorized user.

Instead of the status register 112, a use counter may be used for a transport PIN to specify the current status. When the counter status of the transport PIN indicates, for example, that the transport PIN has not yet been used, this signifies the "first user" status, whereas a counter status which indicates that the transport PIN has been used signifies the "used" status.

The chip card 100 also has a chip card operating system 114. The chip card operating system 114 is able to implement the incorrect entry counter 108 and/or the status register 112 and/or the first user function 110, or parts thereof.

According to one embodiment, after being issued the chip card 100 the authorized user is separately notified of the secret identifier 104, for example in the form of a PIN letter or by electronic means. The first time the chip card 100 is used, the user may query the status of the first user function 110, for example via a chip card terminal, to ensure that the chip card 100 is still unused. Upon the first entry of the identifier 104 provided to the user, the status of the first user function 110 is set to 1.

If the user enters an incorrect identifier multiple times in order to enable the chip card function 106, the incorrect entry counter 108 reaches a counter status which corresponds to the maximum allowable number of incorrect entries. The identifier 104 is blocked when this counter status of the incorrect entry counter 108 has been reached.

By entering a code, the user may then reset the first user function 110 to "first use" status, i.e., status=0. This causes the chip card operating system 114 to switch to an alternate identifier 104', stored in the memory 102, with which an alternate incorrect entry counter 108' is associated. At this point the alternate incorrect entry counter 108 [sic; 108'] still has its initial value in the delivered state. The authorized user of the chip card 100 once again receives the alternate identifier 104' upon request from the issuer of the chip card 100 via a PIN letter or by electronic means. If multiple secret identifiers are stored in the memory 102, this process may be repeated several times.

Figure 2:
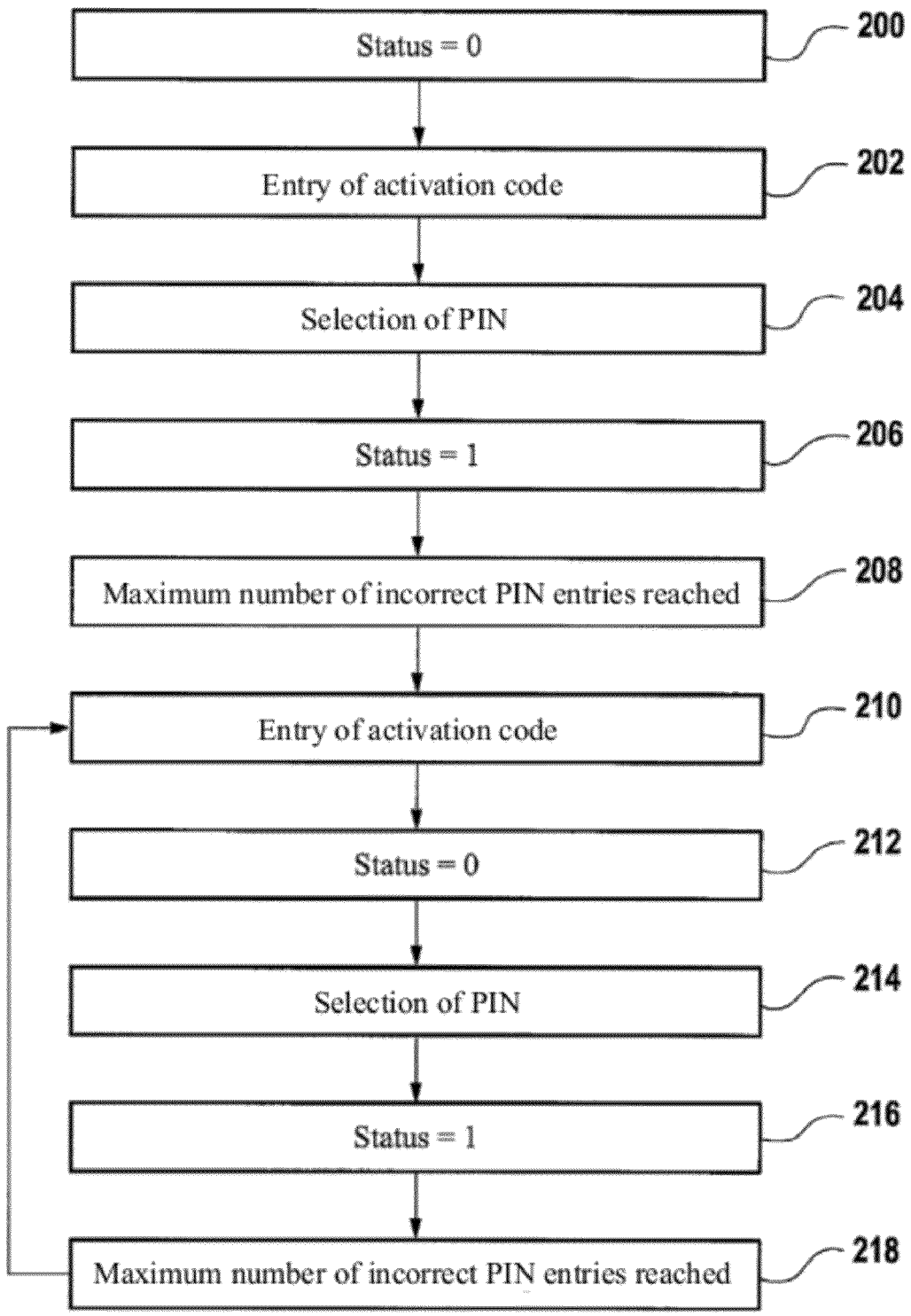
FIG. 2 shows a flow diagram of one embodiment of a method according to the invention.

The code for resetting the first user function 110 may be provided to the user by the issuer of the chip card in a secure manner, for example by mail or by electronic means. The code may also be a "0 PIN" or an activation code, for example. A corresponding flow diagram is shown in FIG. 2.

In step 200 the chip card 100 is in its delivered state; i.e., the status of the first user function 110 is 0. In step 202 the user enters an activation code which he has received, for example by PIN letter from the issuer of the chip card. The user selects a PIN and enters it into the chip card in step 204. By use of the PIN thus specified by the user, the chip card function 106 of the chip card 100 may be enabled at a later time. Accordingly, in step 206 the status of the first user function 110 is set to 1.

The PIN selected by the user may be incorrectly entered at a later time, for example if the user has forgotten his PIN. The PIN is blocked when the maximum number of incorrect entries for the PIN is reached in step 208.

In step 210 the user may enter an additional activation code. This may be the same activation code that was previously entered in step 202, or may be a new activation code which the user has received from the issuer of the chip card 100 upon request. Entry of the activation code in step 210 causes the status of the first user function 110 to be reset to 0 (step 212). As a result, a new PIN may be specified by the user in step 214. Based on the PIN newly specified by the user, the status of the first user function 110 is reset to 1 in step 216. If the maximum number of incorrect entries is reached once again in step 218, depending on the embodiment the sequence of steps 210 through 218 may be repeated one or more times.

Figure 3:
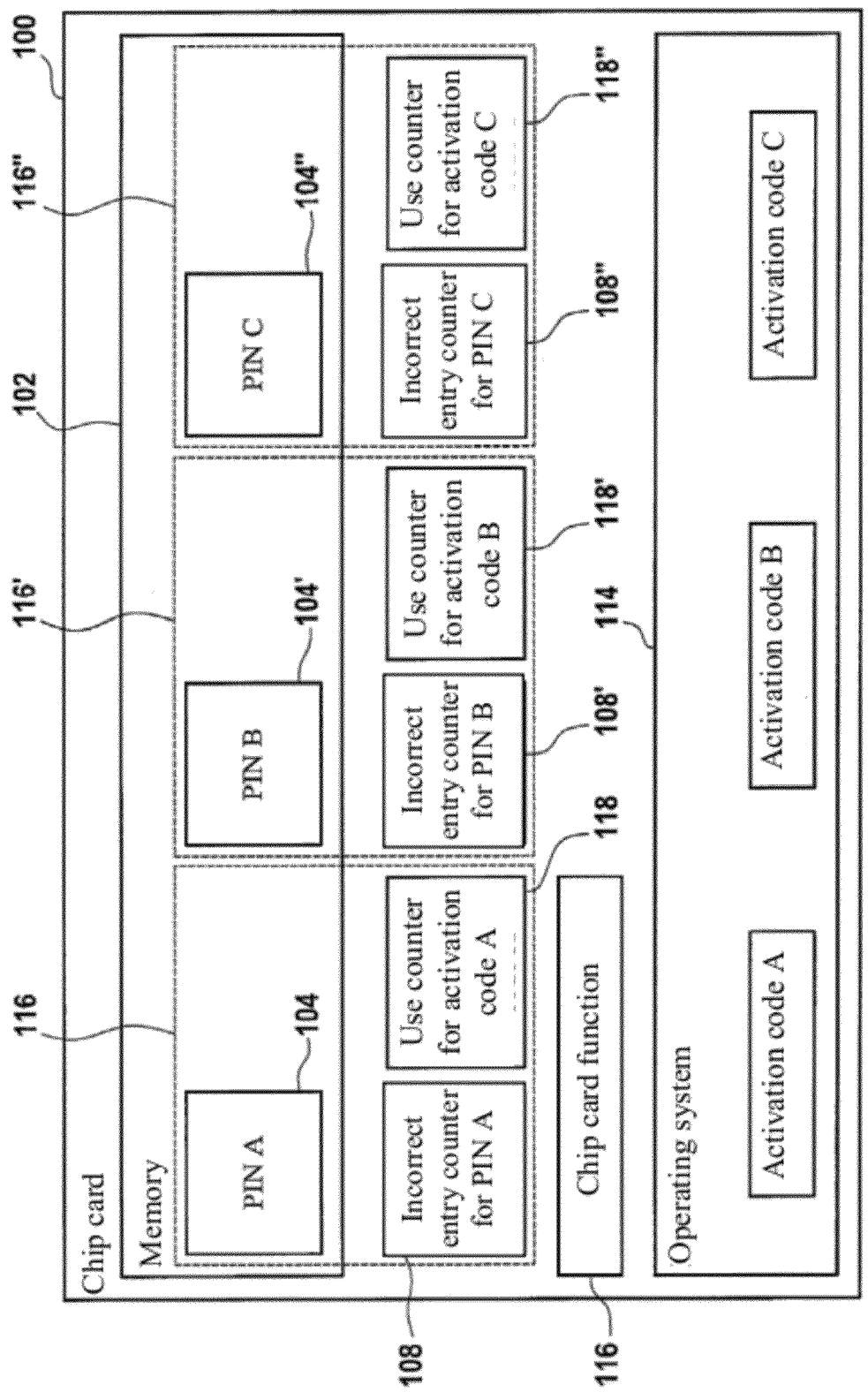
FIG. 3 shows a block diagram of a second embodiment of a chip card according to the invention, having multiple activation codes.

FIG. 3 shows a further embodiment of the chip card 100. In this embodiment the chip card 100 contains multiple PIN objects: in the example in question, PIN objects 116, 116', and 116". PIN object 116 includes the identifier 104, i.e., PIN A which is associated with the incorrect entry counter 108, as well as a use counter 118 for the activation code A, which is associated with PIN A. The same relationship exists for PINs B and C for respective PIN objects 116' and 116", which have corresponding associated incorrect entry counters or use counters.

Activation codes A, B, C for respective PIN objects 116, 116', and 116" are stored in the chip card 100 as part of the operating system 114. In the delivered state of the chip card 100, activation codes A, B, C are fixed, whereas PINs A, B, C can be selected by the user. The use counter ensures that each of the activation codes may be used only once, and as a result the affected PIN for each of the PIN objects may be specified only once by the user. After the affected PIN is blocked due to a maximum number of incorrect entries, the operating system 114 switches to the first unused PIN object, for which the user can then select an alternate PIN.

Figure 4:
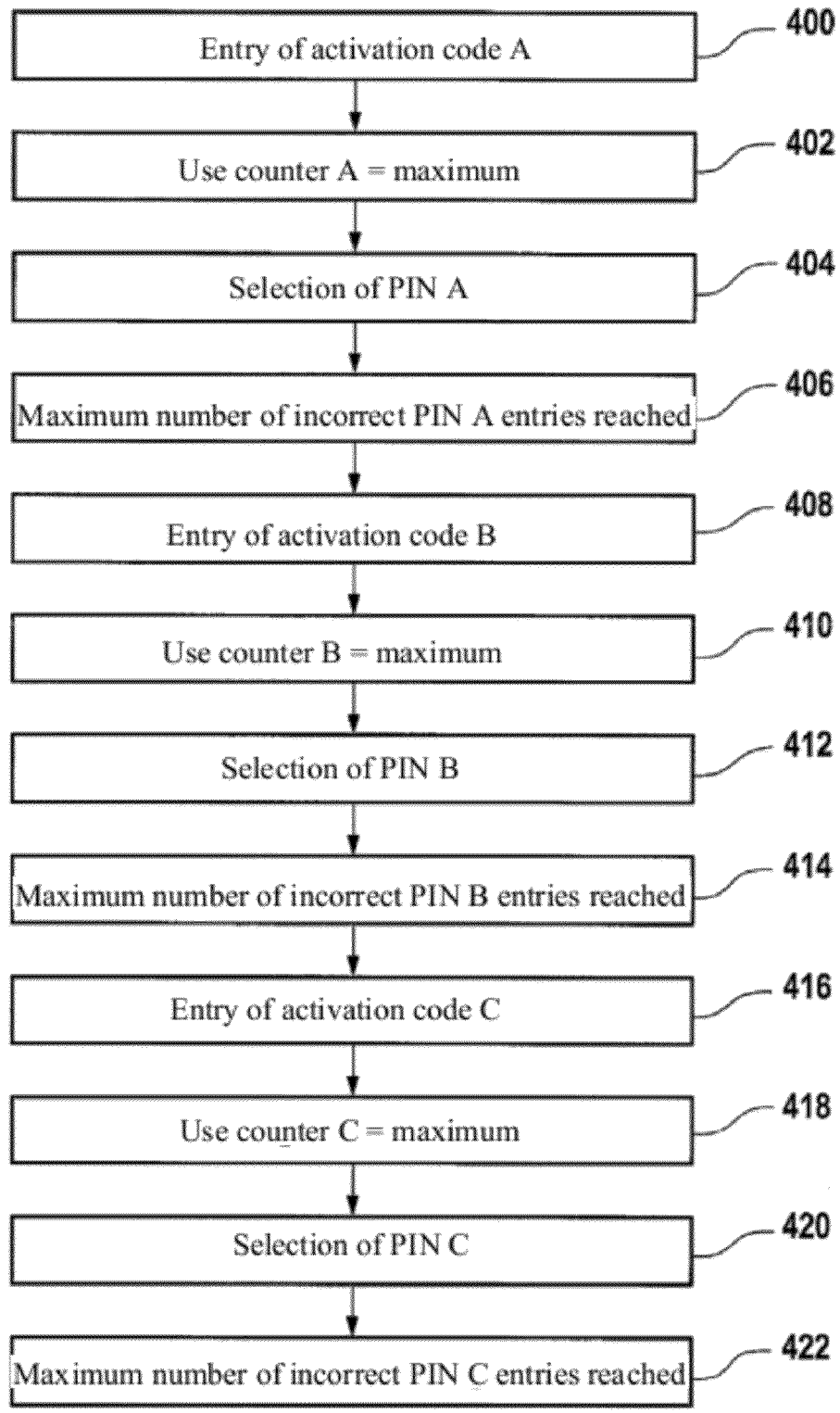
FIG. 4 shows a flow diagram of a further embodiment of a method according to the invention.

FIG. 4 shows the method of operation of the chip card 100 in the embodiment shown in FIG. 3.

In the delivered state of the chip card 100, all incorrect entry counters and use counters are at their initial values, for example 0. For an incorrect entry counter, in the present example a counter status of 0 means that the PIN object in question is blocked. For a use counter, in the present example a counter status of 0 means that the PIN object in question has not yet been initialized by the user by entering the corresponding activation code. On the other hand, a counter status of 1 for a use counter means that the PIN for the corresponding PIN object has already been specified by the user after entering the corresponding activation code.

In the present embodiment, to ensure that each activation code may be used only once the use counters are not resettable. In addition, the incorrect entry counters may be designed so that they cannot be reset. However, the chip card 100 may also be designed so that resetting of an incorrect entry counter is possible using a PUK, but the affected PIN cannot be changed.

In the present embodiment the use counters together with the incorrect entry counters form the first user function (see the first user function 110 in the embodiment shown in FIG. 1). By entry of an activation code, the status of the first user function is switched to the "used" status with regard to the affected PIN object, which is indicated by the counter status of the affected use counter. If this PIN object is subsequently blocked due to a maximum number of incorrect entries, as indicated by a corresponding counter status for the incorrect entry counter, the first user function may be reset by entering an additional activation code for one of the alternate PIN objects. This resetting is performed in such a way that the blocked PIN object is replaced with one of the alternate PIN objects by the operating system 114, whose counter is initially at 0, indicating "first use" status.

FIG. 4 shows a corresponding flow diagram: in step 400 the chip card 100 is in its delivered state. The user of the chip card 100 enters activation code A (step 400) which has been provided to him by electronic means or by mail, for example. The additional activation codes B and C are initially not known to the user, and are not readable from the operating system 114. Entering the activation code A causes the incorrect entry counter 108 for the first PIN object 116 to be set to its maximum value of 3, for example (step 402). The use counter 118 is incremented from 0 to 1. If the activation code A is correctly entered, the user may then enter PIN A which he has selected, thereby storing PIN A as identifier 104 in the memory 102 as part of the PIN object 116 (step 404). The user may then enable the chip card function 116 as needed by entering the applicable PIN A.

With each incorrect entry of PIN A the incorrect entry counter 108 is decremented until it has reached its initial value of 0 (step 406). The PIN object 116 is then blocked. It is not possible to re-enter activation code A to change the PIN, since the use counter is not resettable. In one embodiment of the chip card 100 the incorrect entry counter 108 may be reset, i.e., set to its maximum value of 3. However, if the user has forgotten his selected PIN A this is of no value, since PIN A can no longer be changed. In this situation the user may reset the first user function from "used" status 1, which is indicated by the use counter 118, by entering activation code B for the first alternate PIN object 116' (step 408). This sets the use counter for PIN B to its maximum value (step 410).

As the result of entering activation code B, the operating system 114 replaces the former current PIN object 116 with the first alternate PIN object 116', whose use counter 118' initially is at 0, thus indicating "first use" status. However, entry of activation code B immediately increments the use counter to 1, and the user is able to specify the alternate PIN B (step 412), thereby storing PIN B as identifier 104' in memory 102 as part of the alternate PIN object 116'. The user may then use PIN B to enable the chip card function 116. If the user also forgets PIN B, causing the incorrect operation counter to reach its maximum value of incorrect entries (step 414), the first user function may be reset once again by entering activation code C in order to select PIN C for the alternate PIN object 116" (steps 416 through 422 in an analogous manner as for steps 408 through 414).

Figure 5:
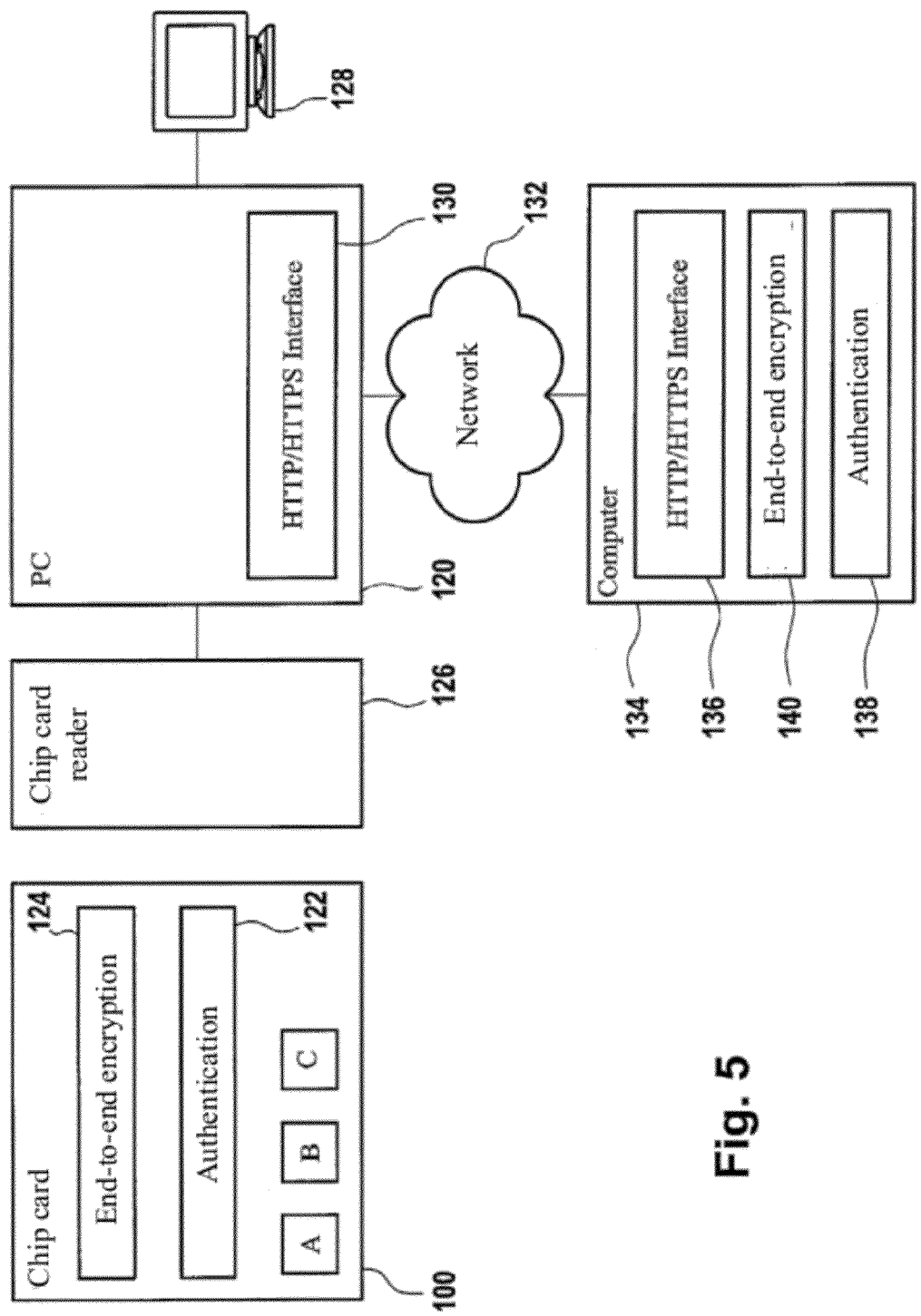
FIG. 5 shows a block diagram of a computer system according to the invention.

FIG. 5 shows a computer 120, for example a PC of a user of the chip card 100. In principle, the chip card 100 may have the same design as the chip cards according to the embodiments described above. For example, activation codes A, B, and C are stored in the chip card 100 as a part of the operating system of the chip card 100. As an addition to the embodiments described above, the chip card 100 has an authentication module 122 and an encryption module 124 for end-to-end encryption.

A chip card reader 126 and a monitor 128 are connected to the computer 120. The computer 120 has an interface 130, for example to a network 132. The network 132 may be the Internet, in which case the interface 130 may be designed as an HTTP- and/or HTTPS-capable interface.

An additional computer 134 is likewise connected to the network 132. This computer may be the server computer of a trust center. The computer 134 has an interface 136 for the network 132, which likewise may be HTTP- and/or HTTPS-capable. The computer 134 also has an authentication module 138 which corresponds to the authentication module 122, and an encryption module 140 which corresponds to the encryption module 124 of the chip card.

If the user of the chip card 100 has forgotten his initially selected PIN A, he may obtain activation code B for resetting the first user function and selecting a new PIN B as follows:

The user inserts the chip card 100 into the chip card reader 126. A connection is then established between the chip card 100 and the computer 134 via the PC 120, its interface 130, and the network 132. Over this connection mutual authentication takes place between the chip card 100 and the computer 134 via the authentication modules 122 and 140. The chip card 100 reads the next unused activation code from the operating system 114, i.e., in the present case activation code B, encrypts it using the encryption module 124, and transmits the encrypted activation code B via the PC 120 to the computer 134, where the activation code B is decrypted by the encryption module 140.

An additional connection, for example a secure messaging connection, is then established between the computer 134 and the PC 120, in particular by use of HTTPS. Activation code B is transmitted via this secure connection from computer 134 to computer 120, and is outputted via the monitor 128, for example. The user obtains activation code B in this manner. The user may manually enter activation code B into the chip card 100. This may be performed automatically by the PC 120. In the latter case it is not necessary to display activation code B on the monitor 128.

Figure 6:
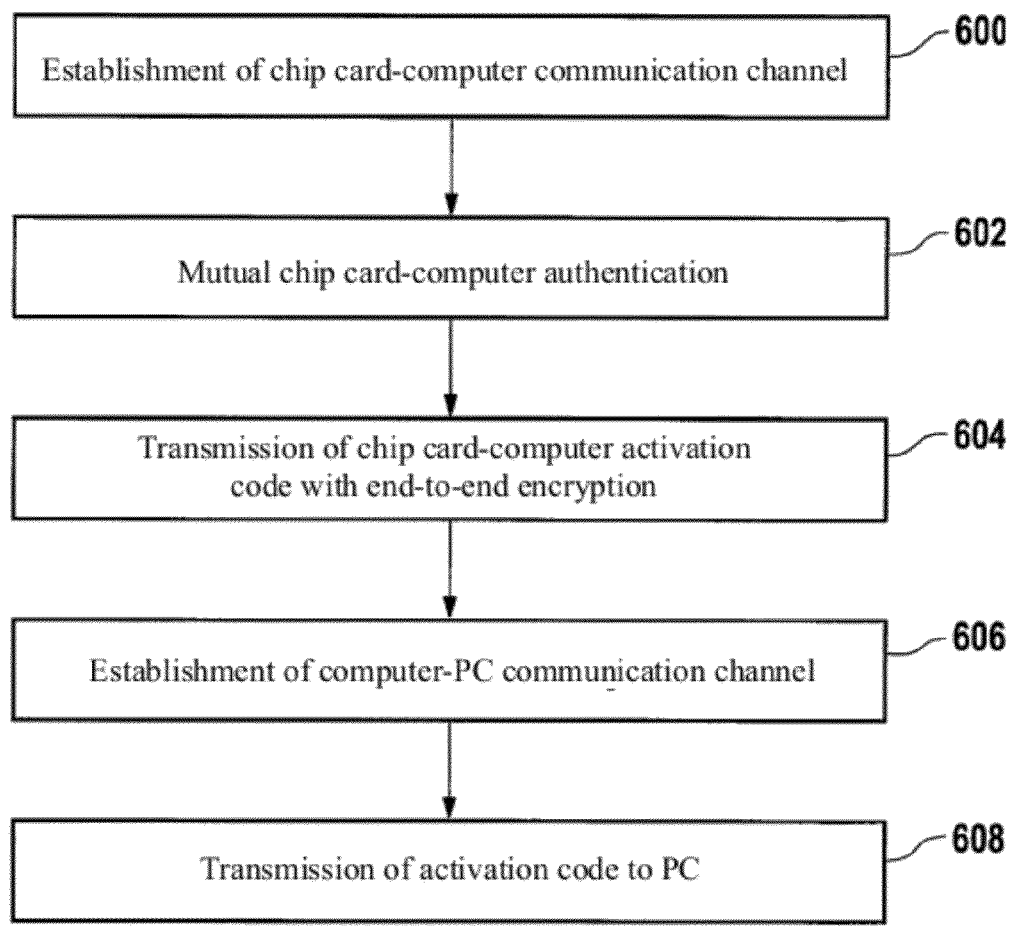
FIG. 6 shows a flow diagram of a third embodiment of a method according to the invention.

FIG. 6 shows a corresponding flow diagram.

In step 600 a communication channel is established between the chip card 100 and the computer 134. After mutual authentication in step 602, a previously unused activation code for the chip card 100 is transmitted from the chip card 100 to the computer 134 by means of end-to-end encryption (step 604). In step 606 a communication channel is established between the computer 134 and the user's computer 120. The activation code previously read from the chip card 100 is transmitted over this communication channel, so that the user receives this activation code in order to select a new identifier for the corresponding alternate PIN object.

LIST OF REFERENCE NUMERALS

100 Chip card
102 Memory
104 Identifier
104' Alternate identifier
104" Alternate identifier
106 Chip card function
108 Incorrect entry counter
108' Alternate incorrect entry counter
108" Alternate incorrect entry counter
110 First user function
112 Status register
114 Chip card operating system
116 PIN object
116' PIN object
116" PIN object
118 Use counter
118' Alternate use counter
118" Alternate use counter
102 Computer
122 Authentication module
124 Encryption module
126 Chip card reader
128 Monitor
130 Interface
132 Network
134 Computer
136 Interface
138 Authentication module
140 Encryption module

The invention claimed is:

1. A chip card, comprising:
multiple PIN objects, whereby each of the PIN objects is formed by: (i) an identifier which may be selected by a user, (ii) an incorrect entry counter associated with the identifier, and (iii) a use counter for an activation code associated with the identifier, whereby the activation codes are stored as part of an operating system of the chip card, and
a first user function, which ensures that the chip card or a given function of the chip card has not been previously been subject to unauthorized use before the user of the chip card has selected the identifier,
wherein:
the first user function is formed by the use counters and the incorrect entry counters by the fact that the status of the first user function with regard to the one of the PIN objects is switched to a "used" status upon receiving the identifier of the one of the PIN objects, which is indicated by a status of the use counter of the one of the PIN objects, and when the one of the PIN objects is blocked the status of the first user function may be reset to the "first use" status upon receiving another of the activation codes associated with another of the PIN objects, thus replacing the blocked PIN object with the other of the PIN objects which has not been previously used, and each activation code may be used only once for resetting the first user function, and the use counters are not resettable.

2. The chip card according to claim 1, whereby the status of the first user function is changed from the "first use" status to the "used" status when an identifier is selected by the user in order to enable one or more of the chip card functions.

3. The chip card according to claim 2, wherein the identifier associated with a given one of the PIN objects is blocked when a maximum number of incorrect entries has been reached as to the identifier, whereby after the identifier is blocked one of the authorization codes associated with an unblocked one of the PIN objects for resetting the first user function may be entered to allow the identifier to be reselected.

4. The chip card according to claim 1, whereby each of the incorrect entry counters have a respective first initial value, which indicates blockage of an associated one of the identifiers, and by entering the corresponding activation code the incorrect entry counters may be set to a second value which differs from the first value by the maximum allowable number of incorrect entries.

5. The chip card according to claim 1, wherein the chip card operates to establish a communication channel to a computer for reading one of the activation codes from the chip card, and to transmit the activation code to the computer.

6. The chip card according to claim 5, wherein the chip card operates to facilitate end-to-end encryption for secure transmission of the activation code to the computer.

7. The chip card according to claim 5, wherein the chip card operates to facilitate mutual authentication of the chip card and the computer.

8. A method for selecting an identifier for enabling a chip card, the chip card having multiple PIN objects stored therein, whereby each of the PIN objects is formed by: (i) an identifier which may be selected by a user, (ii) an incorrect entry counter associated with the identifier, and (iii) a use counter for an activation code associated with the identifier, the method comprising the steps of:

resetting a first user function to a "first use" status by receiving one of the activation codes associated with one of the PIN objects from the user, whereby the first user function is a function of the chip card which ensures that the chip card or a given function of the chip card has not been previously been subject to unauthorized use before the user of the chip card has selected one of the identifiers, switching the first user function to a "used" status by receiving a first of the identifiers from the user in order to enable at least one chip card function, where the first identifier is associated with the one of the PIN objects, blocking the first identifier on the basis of receiving a maximum number of incorrect entries for the first identifier, resetting the first user function to the "first use" status by receiving another of the activation codes associated with another of the PIN objects from the user, and switching the first user function to the "used" status by receiving a second of the identifiers from the user in order to enable at least one chip card function, where the second identifier is associated with the other of the PIN objects, whereby the respective activation code for each of the first and second identifiers may be used only once.

9. The method according to claim 8, further comprising the steps of:

establishing a first communication channel between the chip card and a first computer for transmitting at least one of the activation codes from the chip card to the first computer, and establishing a second communication channel between the first computer and a second computer for transmitting the at least one activation code from the first computer to the second computer.

10. The method according to claim 9, whereby the transmission of the activation code via the first communication channel by use of end-to-end encryption takes place via the second computer.

11. A computer system, comprising:

means for establishing a first communication channel between a computer of a user and a chip card in order to read an activation code for a user-selectable identifier from the chip card, and means for establishing a second communication channel to the computer of the user of the chip card in order to receive the activation code into the computer of the user, wherein the chip card, includes:

multiple PIN objects, whereby each of the PIN objects is formed by: (i) an identifier which may be selected by a user, (ii) an incorrect entry counter associated with the identifier, and (iii) a use counter for an activation code associated with the identifier, whereby the activation codes are stored as part of an operating system of the chip card, and a first user function, which ensures that the chip card or a given function of the chip card has not been previously been subject to unauthorized use before the user of the chip card has selected the identifier, wherein:

the first user function is formed by the use counters and the incorrect entry counters by the fact that the status of the first user function with regard to the one of the PIN objects is switched to a "used" status upon receiving the identifier of the one of the PIN objects, which is indicated by a status of the use counter of the one of the PIN objects, and when the one of the PIN objects is blocked the status of the first user function may be reset to the "first use" status upon receiving another of the activation codes associated with another of the PIN objects, thus replacing the blocked PIN object with the other of the PIN objects which has not been previously used, and each activation code may be used only once for resetting the first user function, and the use counters are not resettable.

12. The computer system according to claim 11, further comprising:

means for end-to-end encryption for transmitting the activation code via the first communication channel, and means for secure messaging for secure reception of the activation code via the second communication channel.

* * * * *